United States Patent Office 2,862,900
Patented Dec. 2, 1958

2,862,900

RESIN-FORTIFIED WAX POLISH COMPOSITIONS

Louis D. Bryant, Indianapolis, and Jerry H. Hunsucker, Carmel, Ind., assignors to J. I. Holcomb Manufacturing Company, Inc., Indianapolis, Ind., a corporation No Drawing. Application September 26, 1955
Serial No. 536,773

5 Claims. (Cl. 260—28.5)

This invention relates to wax polishes and more particularly to certain wax-containing compositions which are admixed with minor amounts of unsaturated ester-type resins.

The polish compositions heretofore known to the art may contain therein, in addition to waxes and suitable liquid vehicles, shellac or synthetic resins in order to make them "self-polishing" and more resistant to wear. Such resin-fortified polishes are very useful but are found to be difficult to remove from polished surfaces. Furthermore, the known resin-fortified polishes attain maximum hardness within a relatively short time after their application, and when they are scuffed or scratched they cannot be repolished to their original luster.

It is an object of this invention to produce resin-fortified wax polishes which have superior hardening characteristics. It is another object of the invention to provide the aforesaid type of wax polishes which can be repeatedly repolished, without additional application of wax. A further object of the invention is to provide polishes which form coatings having superior water-repellency, but which are easily removed from the polished surface whenever desired. Other objects of the invention will be apparent from the disclosure hereinafter made.

In accordance with the stated objects of the invention, there is provided a resin-fortified wax-containing polish composition which comprises, in combination, a vehicle and a film-forming portion which consists essentially of a major amount of a wax and a minor amount of a resin produced by the polymerization of a monomer represented by the formula

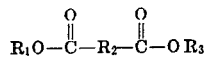

wherein $R_1O-$ represents the residue of a monocarbocyclic monohydric alcohol having from 5 to 6 carbon atoms in the nucleus thereof, $R_2$ represents the atoms which when taken together with the carbonyl groups form the residue of a dicarboxylic acid selected from the group consisting of maleic acid, itaconic acid, dichloromaleic acid, tetrahydrophthalic acid, cis-4-cyclohexene-1,2-dicarboxylic acid, succinic acid, 1,2-cyclopentyl dicarboxylic acid and glutaric acid; and $-OR_3$ represents the residue of an allylic alcohol having from 3 to 5 carbon atoms.

Examples of the monomers described broadly hereinabove are cyclohexylallylmaleate, cyclopentylallylmaleate, cyclohexylallylitaconate, cyclohexylallyltetrahydrophthalate, cyclopentyl-methallyl-cyclopentyl-1,2-dicarboxylate, cyclohexylallyl-cis-4-hexene-1,2-dicarboxylate and the like.

The monomers are polymerized by any of the several methods known to the art, as for example by heating under controlled conditions, use of catalysts such as organic peroxides, ultra violet light, and the like. Generally, the degree of polymerization is most conveniently followed by the change in index of refraction of the liquid polymer, or the change in melting point if a solid at an intermediate stage of polymerization. The polymers employed in the wax compositions of this invention preferably are liquid partial polymers of the named monomers.

The monomeric diesters, and the polymers prepared therefrom are disclosed in the co-pending application of J. H. Hunsucker, Serial No. 536,766, filed September 26, 1955.

The new wax polish compositions of this invention are prepared by the general procedures known to the art, using aqueous or organic solvent vehicles. When aqueous vehicles are used, the film-forming moiety of the polish forms the discontinuous phase of an emulsion, and the vehicle moiety forms the continuous phase, the whole being an aqueous emulsion. Such aqueous emulsions can contain organic solvents if desired. When organic solvents alone are used, solutions or pastes are formed, depending on the amount of solids present in the composition, and any desired amount of the film-forming moiety can be used in this case, according to the type of wax polish composition desired. When aqueous emulsion type wax polish compositions are to be prepared, the solids content is adjusted to be from about 5 to 30%, and preferably from about 8 to 25%. The solids in this case can consist of from about 10 to 95% wax, 2 to 5% emulsifier, and 0.25 to 5% of the named resin. Up to about 90% of the wax can be replaced by shellac, without material change in the desirable hardness and brightness of the polish coating when applied.

Suitable organic solvents for inclusion in the wax-containing compositions of the invention or for use as a vehicle, are wax-dissolving organic solvents, for example, Stoddard's solvent, light paraffin oil, turpentine, benzine, naphtha, petroleum ether; chlorinated solvents such as carbon tetrachloride, trichlorethylene, ethylene dichloride; and the like.

The wax included in the compositions of the invention can be a single wax or a mixture of waxes. Suitable waxes for the purpose are exemplified by paraffin wax, montan wax, carnauba wax, Fischer-Tropsch synthetic wax, Gersthoffen montan wax, ozokerite, beeswax, and the like.

The wax polishes produced according to the present invention can be modified by the addition of dyes, fillers, odorants, pigments, dispersing agents, abrasives and the like, without departing from the scope of the invention.

The following examples will more specifically illustrate the new wax compositions of the invention:

Example 1

A floor wax having superior brightness and hardness characteristics is prepared using the following ingredients:

| | G. |
|---|---|
| Carnauba wax | 37.75 |
| Oxidized microcrystalline wax | 15.0 |
| Oleic acid | 7.20 |
| Aminomethylpropanol | 4.54 |
| Liquid partial polymer of cyclohexylallyl maleate, refractive index $n_D{}^{25}=1.492$ | 7.25 |
| Water, q. s. to make 500.0 g. | |

The oleic acid and aminomethylpropanol are mixed with about half of the water. The waxes are then melted and added thereto in molten state together with the resin, with vigorous agitation, and stirring is continued while the remainder of the water is added until an homogeneous emulsion is formed. The emulsion is then filled into suitable containers for storage or sale.

In place of carnauba wax used in the formula, there can be used an aqual amount of high molecular weight Fischer-Tropsch wax, ozokerite, or Gersthoffen wax.

Example 2

A floor wax is prepared using the following ingredients:

| | Percent |
|---|---|
| Synthetic wax (Duroxon J-324)[1] | 9 |
| Oleic acid | 1.4 |
| Morpholine | 1.4 |
| Liquid polycyclohexylallylmaleate, $n_D^{25}=1.492$ | 2.2 |
| Water | 86 |

[1] A synthetic wax prepared by the Fischer-Tropsch process and melting at about 100° C.

The ingredients are mixed according to the procedure of Example 1.

Example 3

A floor polishing wax is prepared having the following ingredients:

| | Percent |
|---|---|
| Carnauba wax | 8.5 |
| Microcrystalline wax | 0.75 |
| Candelilla wax | 0.75 |
| Oleic acid | 2.0 |
| Morpholine | 1.5 |
| Liquid polycyclohexylallyl-dichloromaleate, $n_D^{25}=1.490$ | 1.5 |
| Water | 85 |

The ingredients are mixed according to the process of Example 1.

Example 4

A paste type shoe polish is prepared by thoroughly mixing the following ingredients:

| | Percent |
|---|---|
| Paraffin wax | 25 |
| Carnauba wax | 24 |
| Liquid polycyclohexylallylmaleate, $n_D^{25}=1.492$ | 1 |
| Turpentine | 25 |
| Benzene | 24.5 |
| Dye | 0.5 |

Example 5

An aqueous emulsion-type shoe polish is made using the following ingredients:

| | Percent |
|---|---|
| Gersthoffen KPS wax [1] | 4.5 |
| Paraffin wax | 1.1 |
| Carnauba wax | 1.7 |
| Liquid polycyclohexylallylitaconate, $n_D^{25}=1.492$ | 0.3 |
| Powdered soap | 0.6 |
| Potassium carbonate | 0.8 |
| Turpentine | 24.4 |
| Water | 66.6 |
| Dye | 0.2 |

[1] Oxidized, esterified montan wax, M. P. 83° C.

The waxes and the resin are mixed with the turpentine, and to this is added, with vigorous agitation, the water, containing the potassium carbonate and soap.

Example 6

An emulsion-type auto polish is prepared using the following:

| | G. |
|---|---|
| Carnauba wax | 25.65 |
| Oleic acid | 5.50 |
| Morpholine | 6.0 |
| Liquid polycyclohexylallylmaleate, $n_D^{25}=1.493$ | 4.35 |
| Carboxymethylcellulose, 1500 cps | 1.0 |
| Linde silicone, LE45 [1] | 1.00 |
| Water, 256.5 g. | |

[1] (An oil-in-water emulsion containing 35±1% dimethyl silicone fluid of approximately 350 cstk. and containing 38.5±1% non-volatile solids, the balance being water.)

The carboxymethylcellulose, oleic acid and morpholine are mixed with the water, and to this is added, with vigorous agitation, the wax, in molten condition, and the resin and silicone. The resulting emulsion is placed in suitable containers.

When used, the compositions of this invention are applied to the surface to be polished in the usual way, and permitted to dry. When dried, the hard coated surface is buffed for maximum gloss. The wax coating becomes even harder over a period of days or weeks, and can be repeatedly buffed to a glossy surface without fresh wax applications. The waxed surfaces thus polished have superior water-repellent characteristics; but when desired, the wax coating is readily removed by the use of an aqueous washing composition containing a detergent.

The invention claimed is:

1. A wax polish composition comprising, in combination, a vehicle comprising a solvent of the class consisting of water and wax-dissolving organic solvents and a film-forming moiety, said film-forming moiety being comprised of a major amount of wax and a minor amount of a liquid partial polymer of an ester represented by the formula

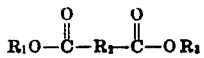

wherein $R_1O$— represents the residue of a monocarbocyclic monohydric alcohol having from 5 to 6 carbon atoms in the nucleus thereof, $R_2$ represents the atoms which when taken together with the carbonyl groups form the residue of a dicarboxylic acid selected from the group consisting of maleic acid, itaconic acid, dichloromaleic acid, tetrahydrophthalic acid, cis-4-cyclohexene-1,2-dicarboxylic acid, succinic acid and glutaric acid; and —$OR_3$ represents the residue of an allylic alcohol having from 3 to 5 carbon atoms.

2. A wax polish composition comprising a vehicle comprising a solvent of the class consisting of water and wax-dissolving organic solvents and a film-forming moiety containing a major amount of wax and a minor amount of partially polymerized cyclohexylallylmaleate.

3. A wax polish composition comprising a vehicle comprising a solvent of the class consisting of water and wax-dissolving organic solvents and a film-forming moiety containing a major amount of wax and a minor amount of partially polymerized cyclohexylallyldichloromaleate.

4. A wax polish composition comprising a vehicle comprising a solvent of the class consisting of water and wax-dissolving organic solvents and a film-forming moiety containing a major amount of wax and a minor amount of partially polymerized cyclohexylallitaconate.

5. An aqueous wax polish composition comprising an aqueous vehicle and a film-forming moiety, said film-forming moiety being comprised of from about 10 to 90% of wax, from about 2 to 5% of emulsifier and from about 0.25 to 5% of a partial polymer of an ester represented by the formula

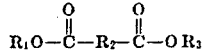

wherein $R_2O$— represents the residue of a monocarbocyclic monohydric alcohol having from 5 to 6 carbon atoms in the nucleus thereof, $R_2$ represents the atoms which when taken together with the carbonyl groups form the residue of a dicarboxylic acid selected from the group consisting of maleic acid, itaconic acid, dichloromaleic acid, tetrahydrophthalic acid, cis-4-cyclohexene-1,2-dicarboxylic acid, succinic acid and glutaric acid; and —$OR_3$ represents the residue of an allylic alcohol having from 3 to 5 carbon atoms.

References Cited in the file of this patent

UNITED STATES PATENTS

| 2,502,645 | Elwell | Apr. 4, 1950 |
| 2,599,119 | McQueen | June 3, 1952 |